US008789061B2

(12) United States Patent
Pavel et al.

(10) Patent No.: US 8,789,061 B2
(45) Date of Patent: Jul. 22, 2014

(54) SYSTEM AND METHOD FOR DATACENTER POWER MANAGEMENT

(75) Inventors: Milan Pavel, Prague (CZ); Stephen B. Boston, New Milford, CT (US); Paul Patti, Nashua, NH (US); Andrew Sanchez, Arlington, TX (US)

(73) Assignee: CA, Inc., Islandia, NY (US)

( * ) Notice: Subject to any disclaimer, the term of this patent is extended or adjusted under 35 U.S.C. 154(b) by 1002 days.

(21) Appl. No.: 12/697,528

(22) Filed: Feb. 1, 2010

(65) Prior Publication Data
US 2011/0191773 A1    Aug. 4, 2011

(51) Int. Cl.
*G06F 9/46*    (2006.01)
*G06F 1/32*    (2006.01)
*G06F 9/50*    (2006.01)
*G06Q 50/06*   (2012.01)

(52) U.S. Cl.
CPC .......... *G06Q 50/06* (2013.01); *G06F 1/329* (2013.01); *G06F 1/3234* (2013.01); *G06F 9/5094* (2013.01)
USPC ........................................................ 718/102

(58) Field of Classification Search
CPC ..... G06F 1/3234; G06F 1/329; G06F 9/4892; G06F 9/5094; Y02B 60/142; Y02B 60/144
USPC ............ 709/201; 705/412; 702/61; 718/104, 718/105
See application file for complete search history.

(56) References Cited

U.S. PATENT DOCUMENTS

| | | | |
|---|---|---|---|
| 2005/0261038 A1* | 11/2005 | Chary ........................... | 455/574 |
| 2009/0119233 A1* | 5/2009 | Dunagan et al. .............. | 705/412 |
| 2009/0187782 A1* | 7/2009 | Greene et al. ................. | 713/340 |
| 2010/0058350 A1* | 3/2010 | Boss et al. .................... | 718/104 |
| 2010/0087963 A1  | 4/2010 | Boston et al. ................. | 700/295 |
| 2010/0115082 A1  | 5/2010 | Pirozzi .......................... | 709/224 |
| 2010/0235840 A1* | 9/2010 | Angaluri ....................... | 718/102 |
| 2010/0299540 A1* | 11/2010 | Brenneman et al. ......... | 713/300 |
| 2011/0040417 A1* | 2/2011 | Wolfe et al. ................... | 700/291 |

OTHER PUBLICATIONS

Bodik et al. Adaptive Power Management/Vision pp. 1-5, Nov. 12, 2008.*
SPEC Power and Performance pp. 1-27 2008.*
Patent Pending U.S. Appl. No. 12/752,226 entitled *Energy Efficient Scheduling System and Method* in the name of Kiran Prakash Diwakar, et al.; 32 total pages, Filed Apr. 1, 2010.

* cited by examiner

*Primary Examiner* — Larry Donaghue
(74) *Attorney, Agent, or Firm* — Baker Botts, LLP

(57) ABSTRACT

A system and method for datacenter power management is disclosed. In particular embodiments, the method includes receiving, with a processor, a request for execution of an application. The method also includes for each of a plurality of datacenters, determining an amount of electricity required to execute the application at the respective datacenter. The method also includes, for each of the plurality of datacenters, determining a cost associated with executing the application at the respective datacenter based, at least in part, on the amount of electricity required to execute the application at the respective datacenter. The method further includes selecting one of the plurality of datacenters to execute the application based, at least in part, on the cost associated with executing the application at the respective datacenter and executing the application at the selected datacenter.

13 Claims, 2 Drawing Sheets

SYSTEM AND METHOD FOR DATACENTER POWER MANAGEMENT

TECHNICAL FIELD OF THE INVENTION

The present invention relates generally to scheduling the execution of applications, and more particularly to a system and method for datacenter power management.

BACKGROUND OF THE INVENTION

Efficient resource utilization at datacenters is facilitated by the execution of applications at appropriate times. Unintelligent scheduling of application execution may result in poor application performance, increased costs due to excessive resource utilization, and higher maintenance costs for network operators. Currently, network applications, processes and tasks are executed at indiscriminate times. That is, the current scheduling of applications is not done based on an intelligent determination of resource utilization. In some cases, the execution does not follow any dollars-saving logic with regard to power consumption, but rather are mostly scheduled depending on need or demand.

SUMMARY OF THE INVENTION

In accordance with the present disclosure, the disadvantages and problems associated with prior systems and methods for datacenter power management have been substantially reduced or eliminated.

In accordance with a particular embodiment of the present disclosure, a method includes receiving, with a processor, a request for execution of an application. The method also includes for each of a plurality of datacenters, determining an amount of electricity required to execute the application at the respective datacenter. The method also includes for each of the plurality of datacenters, determining a cost associated with executing the application at the respective datacenter based, at least in part, on the amount of electricity required to execute the application at the respective datacenter. The method further includes selecting one of the plurality of datacenters to execute the application based, at least in part, on the cost associated with executing the application at the respective datacenter. Additionally, the method includes executing the application at the selected datacenter.

In accordance with another embodiment of the present disclosure, a system includes a client operable to transmit a request to execute an application to a scheduling server. The scheduling server is operable to receive the request to execute the application and, for each of a plurality of datacenters, determine an amount of electricity required to execute the application. The scheduling server is further operable to, for each of the plurality of datacenters, determine a cost associated with executing the application at the respective datacenter based, at least in part, on the amount of electricity required to execute the application at the respective datacenter. Additionally, the scheduling server is operable to select one of the plurality of datacenters to execute the application based, at least in part, on the cost associated with executing the application at the respective datacenter. The system further includes the selected one of the plurality of datacenters is operable to execute the application.

In accordance with yet another embodiment of the present disclosure, a tangible computer readable storage medium comprises logic, and the logic is operable, when executed on a process to receive a request for execution of an application. The logic is further operable to, for each of a plurality of datacenters, determine an amount of electricity required to execute the application, and for each of the plurality of datacenters, determine a cost associated with executing the application at the respective datacenter based, at least in part, on the amount of electricity required to execute the application at the respective datacenter. The logic is further operable to select one of the plurality of datacenters to execute the application based, at least in part, on the cost associated with executing the application at the respective datacenter. The logic is further operable to execute the application at the selected datacenter.

Technical advantages of certain aspects of the present disclosure include scheduling the execution time of an application, process, or task when the overall machine use is lowest and when the power consumed is at its cheapest price of the day, as set by an electricity provider or other source supplying electrical power to datacenters. Particular embodiments allow operators to utilize servers as much as possible during the periods when the price per kilowatt-hour is the lowest.

Moreover, particular embodiments of the present disclosure determine the electricity consumed by specific processes, applications, or tasks by measuring the number of cycles on the CPU and comparing it against benchmark data from the specific CPU speed and configuration. Particular embodiments may look to the operating system for the resource utilization information and may use the processor utilization information assigned to each process. It may then take the processor utilization and derive the number of watts utilized based on a table of information about CPU speed, make and model and the wattage consumed at different levels of utilization to derive the number of watts per CPU cycle. To get the wattage per process, particular embodiments of the disclosure take the wattage per CPU cycle and multiply it by the processes utilized by the application, process or task. Then it also derives the amount of money it takes to run the application, process, or task at different times of the day based on the price per kilowatt-hour information. In particular embodiments, this information can be obtained using a web-based application to periodically check and download information from an internetwork or the Internet. With this information, particular embodiments determine the time of day and a particular datacenter that will result in the lowest price for running the process, application, or task. Particular embodiments may also determine what combination of applications, processes, or tasks can be run simultaneously to result in the lowest price.

Particular embodiments of the present disclosure may be integrated with network management applications as well as job scheduling applications by adding a cost/benefit/combination layer to the scheduling of processes, applications, or tasks. It can also be integrated with workload automation applications to schedule jobs for running within most efficient timeframes or at optimal times. Additionally, embodiments of the present disclosure may also be integrated with Configuration Management Database (CMDB) systems, in order to give a particular application, job, or other processing entity associated characteristics related to the efficient scheduling of its CPU resources. Moreover, particular embodiments allow operators to intelligently forecast power consumption and pricing based on scheduling of application execution. Embodiments of the present disclosure may additionally determine the best and most efficient schedule for executing network applications, tasks or processes. Overall, embodiments of the present disclosure may reduce costs for an enterprise, by using the cheapest available electricity at any given execution time. Additionally, particular embodiments may not require an operator to eliminate any processes from the CPU, only to schedule and combine them differently to get the best and cheapest use out of existing processors.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
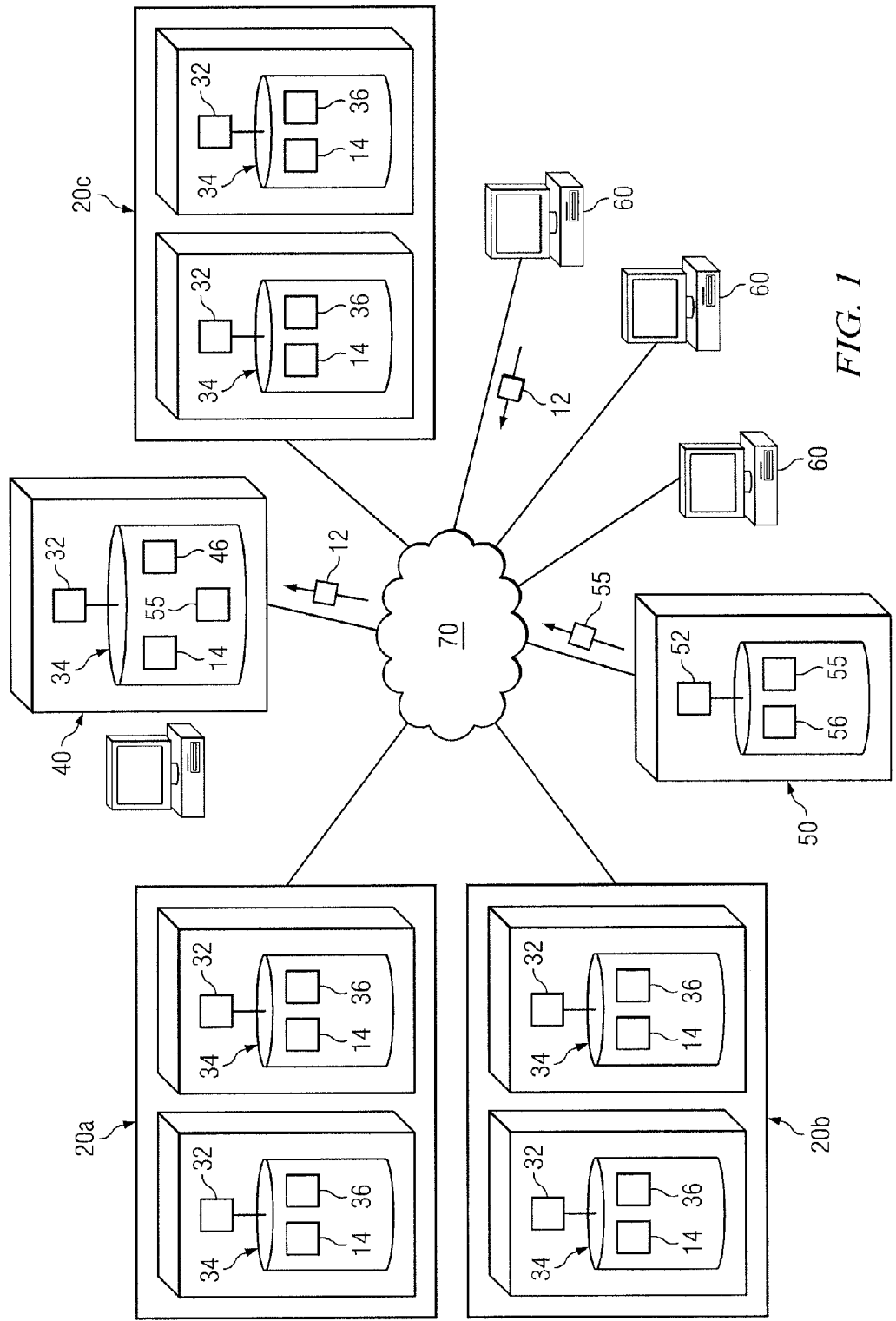
FIG. 1 illustrates a system that facilitates the execution of an application during a least-cost electricity usage time.

FIG. 1 illustrates a system 10 in accordance with embodiments of the present disclosure. System 10 comprises datacenters 20, servers 30, scheduling server 40, price server 50, clients 60, and network 70. System 10 is generally operable to optimally schedule the execution of applications at a particular datacenter 20 at a time for which a price of executing the application is the least expensive. To optimally schedule the execution of applications, scheduling server 40 receives price data 55 that indicates a price of electricity associated with each respective datacenter 20 from price server 50. Price data 55 may include a price of electricity for each of a plurality of predetermined times of day. Scheduling server 40 determines an amount of electricity consumed by each respective server 30 for a predetermined unit of processing time and a number of predetermined units of time required to execute the application on each respective server 30. Using the number of predetermined units of time required to execute the application on server 40, the amount of electricity consumed for each respective server 30 at each respective datacenter 20 for the predetermined unit of time, and a price of electricity associated with each respective datacenter 20, scheduling server 40 determines a price associated with executing the application at each respective datacenter 20. Scheduling server 40 may then select the least-cost datacenter 20 to execute the application. Scheduling server 40 may then schedule execution of the application at the selected datacenter 20.

In particular embodiments, one or more clients 60 transmit request 12 to scheduling server 40 to execute application 14 at datacenter 20. Clients 60 may transmit to scheduling server 40 information indicating the type of requested application 14, an amount of memory and/or CPU processing power required by the requested application 14, an amount of data that will be used during the execution of application 14, a preferred and/or mandatory time at which the requested application 14 should be processed, and/or any other relevant considerations, factors, or variables that facilitate the determination of a least-cost execution.

At appropriate points during operation, scheduling server 40 receives information associated with the price of electricity powering datacenters 20 from price server 50. In particular embodiments, price server 50 may transmit price data 55 to scheduling server 40 in response to a request for electricity price information from scheduling server 40, at predetermined times, and/or in response to any change in the price of electricity that powers a particular datacenter 20. Price data 55 includes information indicating a price of electricity at one or more datacenters 20. In some embodiments, price data 55 may include information indicating the price of electricity at predetermined times. For example, price data 55 may indicate that electricity costs 18 cents/kilowatt hour during peak-demand hours and 12 cents/kilowatt hour during off-peak hours. As another example, price data 55 may indicate the price of electricity at a particular hour and/or minute. Additionally, price data 55 may indicate the price of electricity at the time price data 55 is transmitted and/or the price of electricity at a time subsequent to the transmission of price data 55. In general, price data 55 may indicate the price of electricity power a particular datacenter 20 for any appropriate past, present or future period of time. For particular electrical providers that dynamically change the price of electricity that powers a particular datacenter 20, price server 50 may transmit price data 55 to scheduling server 40 as the price of electricity changes. Thus, scheduling server 40 has an updated price of electricity that powers each respective datacenter 20.

Scheduling server 40 determines at which of a plurality of datacenters 20 to execute application 14 based, at least in part, on price data 55. Scheduling server 40 may also determine at which of a plurality of datacenters 20 to execute application 14 based, at least in part, on an estimated amount of processing time required to execute application 14 at each respective datacenter 20 and an estimated amount of watts of power utilized for a given unit of processing time. Scheduling server 40, in particular embodiments, multiplies the estimated amount of watts of power utilized for a given unit of processing time by the estimated amount of processing time required to execute application 14 to determine an estimated amount of watts that will be utilized during the execution of application 14. Scheduling server 40 may then multiply an estimated amount of watts that will be utilized when application 14 is executed by the price of electricity for the datacenter 20 as indicated in price data 55. Thus, scheduling server 40 may determine the least-cost method of executing application 14.

Datacenters 20a, 20b, and 20c (which may be referred to individually as "datacenter 20" or collectively as "datacenters 20") are facilities that each house a collection of servers, computers, networking equipment, data storage systems, security devices, power supplies and/or any other appropriate hardware, software and/or other equipment suitable to facilitate the execution applications 14. In some embodiments datacenter 20 represents a processing site at which applications 14 are executed. As shown in FIG. 1, datacenters 20 may be geographically dispersed. In some embodiments, datacenter 20 may be geographically clustered. In particular embodiments, datacenter 20 houses server 30 and/or scheduling server 40, each of which may execute application 14 requested by client 60. To provide electricity to datacenter 20 and the components therein, datacenter 20 is connected to an electrical power provider. The electrical power provider may charge different rates to datacenter 20 during different times of the day. For example, a the price charged for electricity may be more expensive during peak-demand times of the day, and less expensive during off-peak times. The price charged may be measured as a rate. For example, the price of electricity may be measured in dollars per kilowatt-hours. Thus, the peak-demand price, for example, may be $0.25 per kilowatt-hours, and the off-peak price may be $0.15 per kilowatt hours. In some embodiments, the price of electricity charged to datacenter 20 fluctuates dynamically during the day in response to electricity demand.

Servers 30 are housed in datacenters 20 and execute applications 14 requested by clients 60. Servers 30 may also include one or more computer input devices, such as a keyboard, trackball, or a mouse, and/or one or more Graphical User Interfaces (GUIs), through which a user may interact with the logic executing on processor 32. In general, however, server 30 may include any appropriate combination of hardware, software, and/or encoded logic suitable to perform the described functionality. In some embodiments, server 30 may comprise a general-purpose personal computer (PC), a Macintosh, a workstation, a Unix-based computer, a server computer, or any suitable processing device. The functions and operations described above may be performed by a pool of servers 30. A server 30 may comprise memory 34 and processor 32.

Memory 34 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. Although FIG. 1 illustrates memory 34 as internal to server 30, it should be understood that memory 34 may be internal or external to server 30, depending on particular implementations. Memory 34 may be separate from or integral to other memory devices to achieve any suitable arrangement of memory devices for use in system 10.

Memory 34 stores applications 14 and data associated with applications 14. In some embodiments, memory 34 stores an amount of watts consumed by processor 32 for a predetermined unit of time. The amount of watts consumed by processor 32 may be measured as watts per Central Processing Unit (CPU) cycle. Memory 34 may also store an amount of CPU cycles a particular application 14 utilizes during execution. Memory 34 also stores logic 36. Logic 36 generally comprises rules, algorithms, code, tables, and/or other suitable instructions for executing applications 14 and storing and/or generating data associated with applications 14.

Memory 34 is communicatively coupled to processor 32. Processor 32 is generally operable to execute logic 36 to execute applications 14 requested by clients 60, and/or determine an amount of watts consumed by processor 32 per predetermined unit of processing time. Processor 32 comprises any suitable combination of hardware and software implemented in one or more modules to provide the described function or operation.

Scheduling server 40 determines at which of a plurality of datacenters 20 to execute a requested application 14 based, at least in part, on price data 55, an amount of watts per unit of processing time utilized by server 30 in executing a requested application 14, and an estimated amount of CPU cycles required to execute a requested application 14. Using the relevant factors, scheduling server 40 may select a datacenter 20 at which client 60 should execute a requested application 14, and may instruct client 20 to execute a requested application 14 at the selected datacenter 20. In particular embodiments, scheduling server 40 may execute a requested application 14 at the selected datacenter 20, and transmit a display, print-outs, data, information, audio, video, and/or any other suitable results of executing application 14. In some embodiments, scheduling server 40 may comprise a general-purpose personal computer (PC), a Macintosh, a workstation, a Unix-based computer, a server computer, or any suitable processing device. The functions and operations described above may be performed by a pool of scheduling servers 40. As described below with respect to FIG. 2, scheduling server 40 may comprise memory 44 and processor 42.

Price server 50 determines and stores price data 55, which includes information associated with the price of electricity at one or more datacenters 20. Price server 50 transmits price data 55 to scheduling server 40 and/or other relevant components of system 10. In some embodiments, price data 55 may include information indicating the price of electricity during predetermined times. For example, price data 55 may indicate the price of electricity during peak-demand and/or off-peak hours at a particular datacenter 20. As another example, price data 55 may indicate the price of electricity at a particular hour and/or minute. Additionally, price data 55 may indicate the price of electricity at the time price data 55 is transmitted and/or the price of electricity at a time subsequent to the transmission of price data 55. In general, price data 55 may indicate the price of electricity power a particular datacenter 20 for any appropriate past, present or future period of time. Price data 55 may also indicate historical prices and/or trends for the price of electricity supplied to one or more datacenters 20. For particular electrical providers that dynamically change the price of electricity that powers a particular datacenter 20, price server 50 may transmit price data 55 to scheduling server 40 as the price of electricity changes. Price server 50 may determine price data 55 from electrical service providers, from publicly available information sources, from server 40 located at datacenters 20 and/or any other appropriate source.

Price server 50 may comprise any suitable combination of hardware and/or software implemented in one or more modules to provide the described functions and operations. In some embodiments, price server 50 may comprise a general-purpose personal computer (PC), a Macintosh, a workstation, a Unix-based computer, a server computer, or any suitable processing device. In some embodiments, the functions and operations described above may be performed by a pool of multiple price servers 50. Particular embodiments of system 10 may include a price server 50 located at each respective datacenter 20, and/or one or more price servers 50 located at a single or several locations that determine price data 55 for multiple datacenters 20. Price server 50 may be maintained by an enterprise that operates system 10, an electrical provider that supplies electricity to one or more datacenters 20 and/or any other suitable third party. A particular market data server 40 may comprise memory 54 and processor 52.

Memory 54 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information, including price data 55. Although FIG. 1 illustrates memory 54 as internal to price server 50, it should be understood that memory 54 may be internal or external to price server 50, depending on particular implementations. Memory 54 may be separate from or integral to other memory devices to achieve any suitable arrangement of memory devices for use in system 10. Memory 54 stores price data 55. Memory 54 also stores logic 56. Logic 56 generally comprises rules, algorithms, code, tables, and/or other suitable instructions for storing and/or price data 55.

Memory 54 is communicatively coupled to processor 52. Processor 52 is generally operable to execute logic 56 to generate, receive and/or transmit price data 55. Processor 52 comprises any suitable combination of hardware and software implemented in one or more modules to provide the described function or operation.

Clients 60 (which may be referred to individually as "client 30" or collectively as clients 30) may transmit request 12 to scheduling server 40 to execute application 14. Request 12 represents any form of data transmission, including information transmitted in an Internet Protocol packet, Ethernet frame, Asynchronous Transfer Mode cell, Frame Relay frame, and/or any other suitable mode of data communication. In some embodiments, application 14 includes any suitable software and/or logic executable on server 30, including, but not limited to, a word processing program, a database management system, an email program, an internet browser, logistics management, a client relations management program, and/or batch processing data. In particular embodiments, clients 60, transmit request 12 to scheduling server 40 as part of executing application 14 itself. In particular embodiments, clients 60 represent general or special-purpose computers operating software applications capable of performing the above-described operations. For example, clients 60 may include, but are not limited to, laptop computers, desktop computers, portable data assistants (PDAs), and/or portable media players. In some embodiments, client 60 comprises general-purpose personal computer (PC), a Macintosh, a workstation, a Unix-based computer, a server computer, or any suitable processing device. Additionally, in particular embodiments, client 60 may include one or more processors operable to execute computer logic and/or software encoded on tangible media that performs the described functionality. Client 60 may also include one or more computer input devices, such as a keyboard, trackball, or a mouse, and/or one or more Graphical User Interfaces (GUIs), through which a user may interact with the logic executing on the processor of client 60. In general, however, client 60 may include any appropriate combination of hardware, software, and/or encoded logic suitable to perform the described functionality. Additionally, clients 60 may be connected to or communicate with scheduling server 40 and/or datacenters 20 directly or indirectly over network 70. Clients 60 may couple to network 70 through a dedicated wired or wireless connection, or may connect to network 70 only as needed to receive, transmit, or otherwise execute applications. Although FIG. 1 illustrates, for purposes of example, a particular number and type of clients 60, alternative embodiments of system 10 may include any appropriate number and type of clients 60, depending on the size of a particular enterprise.

Network 70 may represent any number and combination of wireline and/or wireless networks suitable for data transmission. Datacenters 20, server 30, scheduling server 40, price server 50, and clients 60 are communicatively coupled via one or more networks 70. In particular embodiments, clients 60 may communicatively couple to datacenters 20 and/or scheduling server 40 via network 70. Network 70 may, for example, communicate internet protocol packets, frame relay frames, asynchronous transfer mode cells, and/or other suitable information between network addresses. Network 70 may include one or more intranets, local area networks, metropolitan area networks, wide area networks, cellular networks, all or a portion of the Internet, and/or any other communication system or systems at one or more locations.

In an exemplary embodiment of operation, one or more clients 60 transmit request 12 to scheduling server 40 to execute application 14. Request 12 may be transmitted over network 70, and may include information indicating the type of requested application 14, an amount of memory and/or CPU processing power required by the requested application, an amount of data that will be used during the execution the application 14, a preferred and/or mandatory time at which requested application 14 should be processed, and/or any other relevant considerations, factors, or variables that facilitate the determination of a least-cost execution.

Scheduling server 40 receives the request from client 60, and determines which particular datacenter 20 should execute requested application 14. Scheduling server 40 determines at which of a plurality of datacenters 20 to execute requested application 14 based, at least in part, on price data 55 received from price server 50, an estimated amount of processing time required to execute application 14 at each respective datacenter 20, and an estimated amount of watts of electricity utilized for a given unit of processing time.

At appropriate points during operation, scheduling server 40 may determine, for one or more servers 30, an estimated amount of watts of electricity utilized for a given unit of processing time on the respective server 30. In some embodiments, scheduling server 40 may determine an amount of watts per CPU cycle a relevant server 30 consumes. For example, an operator of system 10 may perform benchmark tests on server 30 using standardized testing applications, while an electrical meter determines an amount of electricity consumed during the benchmark test. An operating system of server 30 may indicate a number of CPU cycles processor 32 utilized during the benchmark test. Dividing the amount of electricity consumed (as determined by the electrical meter) by the number of CPU cycles results in a measurement of watts consumed per CPU cycle. In general, however, scheduling server 40 and/or any other appropriate component of system 10 determines an amount of watts of electricity utilized for a given unit of processing time on servers 30 through any appropriate method. Scheduling server 40 may store the number of watts of electricity consumed per CPU cycle for each server 30 included in system 10 in a table in memory 44.

As mentioned above, scheduling server 40 receives information associated with the price of electricity powering datacenters 20 from price server 50. In particular embodiments, price server 50 may transmit price data 55 to scheduling server 40 in response to a request for electricity price information from scheduling server 40, at predetermined times, and/or in response to any change in the price of electricity that powers a particular datacenter 20. Price data 55 includes information indicating a price of electricity at one or more datacenters 20. In some embodiments, price data 55 may include information indicating the price of electricity at predetermined times. Price data 55 may indicate the price of electricity during peak-demand times and/or off-peak times. As another example, price data 55 may indicate the price of electricity at a particular hour and/or minute. Additionally, price data 55 may indicate the price of electricity at the time price data 55 is transmitted and/or the price of electricity at a time subsequent to the transmission of price data 55. In general, price data 55 may indicate the price of electricity power a particular datacenter 20 for any appropriate past, present or future period of time. For particular electrical providers that dynamically change the price of electricity that powers a particular datacenter 20, price server 50 may transmit price data 55 to scheduling server 40 as the price of electricity changes. Thus, scheduling server 40 has an updated price of electricity that powers each respective datacenter 20.

In response to receiving request 12 to execute application 14 from client 60, scheduling server may determine an amount of processing time required to process application 14. Scheduling server 40 may determine the amount of processing time required in any appropriate manner. In some embodiments, client 60 may transmit an estimated amount of processing time required in conjunction with the request. In some embodiments, scheduling server 40 may receive operator input that includes a list of applications indicating an estimated amount of processing time required for each. Scheduling server 40 is thus able to determine an amount of processing time required to execute application 14 by looking up the relevant value in the in the list of applications. In some embodiments, scheduling server 40 may determine, based on the size of data requested and/or transmitted, an estimated amount of processing time required to process the data. In some embodiments, scheduling server 40 may determine an estimated amount of processing time required to process the data based on stored information indicating an amount of processing time during previous execution(s) of application 14.

Based on price data 55, an amount of watts per unit of processing time for one or more respective servers 30, and an amount of processing time required to process application 14, scheduling server 40 determines at which of a plurality of datacenters 20 to execute requested application 14. In particular embodiments, to select a datacenter 20 at which to execute application 14, scheduling server 40, for each server 30, multiplies the estimated amount of watts of power utilized for a given unit of processing time at each respective server 30 by the estimated amount of processing time required to execute application 14 at each respective server 30 to determine an estimated amount of watts that will be utilized when application 14 is executed on each respective server 30. Scheduling server 40 may then multiply an estimated amount of watts that will be utilized when application 14 is executed at a respective server 30 by the price of electricity for the datacenter 20 at which the respective server 30 is located as indicated in price data 55.

Scheduling server 40 may calculate an estimated price of executing the application at various times of day at each of the plurality of datacenters 20. As a result, scheduling server 40 determines an least expensive time at which to execute application 14. For example, scheduling server 40 may determine that it is less expensive to execute application 14 at datacenter 20a at a time subsequent to the time request 12 is received (when datacenter 20a is experiencing off-peak hours), rather than at datacenter 20b contemporaneously with request 12 (when datacenter 20b is experience peak-demand hours). As another example, scheduling server 40 may determine that it is less expensive to execute application 14 at datacenter 20c contemporaneous to receiving request 12 (when datacenter 20c is experiencing off-peak hours), rather than at datacenter 20b contemporaneous to receiving request 12 (when datacenter 20b is experiencing peak-demand hours). As a result, scheduling server 40 may time-shift and/or geographically-shift the execution of request applications 14. Thus, scheduling server 40 may determine the least-cost method of executing application 14. The selected datacenter 20 at which the cost of executing applications 14 is the least expensive may be referred to as a least-cost datacenter 20. The selected time at which the application will be executed may be referred to as a least-cost execution time.

Once a least-cost datacenter 20 is selected, scheduling server may transmit an instruction to client 20 to execute the requested application at the selected least-cost datacenter 20 at the selected least-cost execution time. In particular embodiments, scheduling server 40 itself may execute the requested application at the selected least-cost datacenter 20 at the least-cost execution time, and may transmit a display, print-outs, data, information, audio, video, and/or any other suitable results of executing the application.

Based on the foregoing operations, system 10 is able to calculate a lowest cost for executing applications 14 requested by clients 60. In general, system 10 allows the execution time of application, process or task to be scheduled when the overall machine use is lowest and when the power consumed is at its cheapest price of the days as set by an electricity provider or other source supplying power to datacenters 20. Particular embodiments of system 10 allows operators to utilize server 30 included in system as much as possible during the periods when the price per kilowatt-hour is the lowest.

Moreover, this method determines the electricity consumed by specific processes, applications or tasks by measuring the number of cycles on the CPU and comparing it against benchmark data from the specific CPU speed and configuration. System 10 may look to the operating system for the resource utilization information. It may use the processor utilization information assigned to each process. It may then take the processor utilization and derive the number of watts utilized based on a table of information about the CPU speed, make and model and the wattage consumed at different levels of utilization to derive the number of watts per CPU cycle. In particular embodiments, to get the wattage per process, the invention takes the wattage per CPU cycle and multiplies it by the processes utilized by the application, process or task. Then it also derives the amount of money it takes to run the application, process or task at different times of the day based on the price per kilowatt-hour information included in price data 55. In particular embodiments, this information can be obtained using a web-based application to periodically check and download information from an inter-network or the Internet. With this information, system 10 determines the time of day and a particular datacenter 20 that will result in the lowest price for running the process, application, or task. System 10 may also determine what combination of applications, processes or tasks can be run simultaneously to result in the lowest price.

System 10 may be integrated with network management applications as well as job scheduling applications by adding a cost/benefit/combination layer to the scheduling of processes, applications or tasks. It can also be integrated with workload automation applications to schedule jobs for running within most efficient timeframes or at optimal times. System 10 may also be integrated with Configuration Management Database (CMDB) systems, in order to give a particular application, job, or other processing entity associated characteristics related to the efficient scheduling of its CPU resources. Moreover, system 10 allows operators to intelligently forecast power consumption and pricing based on scheduling of application execution. System may additional determine the best and most efficient schedule for executing network applications, tasks or processes. Overall, system 10 may reduce costs for an enterprise, by using the cheapest available electricity at any given execution time. Additionally, in particular embodiments, system 10 may not require an operator to eliminate any processes from the CPU, only to schedule and combine them differently to get the best and cheapest use out of existing processors.

Modifications, additions, or omissions may be made to system 10 without departing from the scope of the present disclosure. For example, when a component of system 10 determines information, the component may determine the information locally or may receive the information from a remote location. As another example, in the illustrated embodiment, servers 30, scheduling server 40, price server 50, and clients 60 are represented as different components of system 10. However, the functions of servers 30, scheduling server 40, price server 50, and clients 60 may be performed by any suitable combination of one or more servers or other components at one or more locations. In the embodiment where the various components are servers, the servers may be public or private servers, and each server may be a virtual or physical server. The server may include one or more servers at the same or at remote locations. Also, servers 30, scheduling server 40, price server 50, and clients 60 may include any suitable component that functions as a server. Additionally, system 10 may include any appropriate number of servers 30, scheduling servers 40, price servers 50, and clients 60. Any suitable logic may perform the functions of system 10 and the components within system 10.

Figure 2:
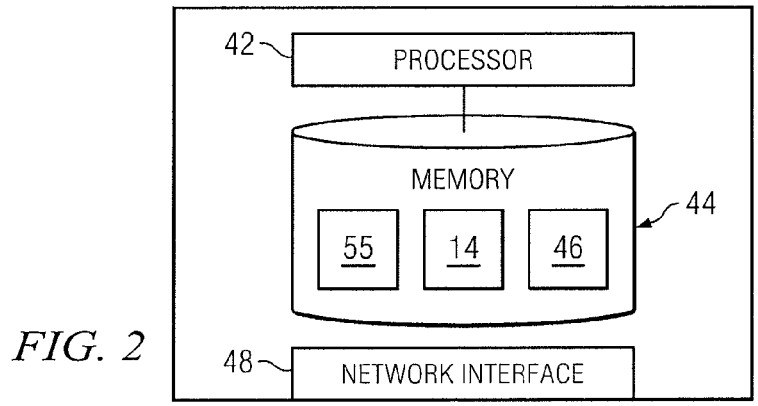
FIG. 2 illustrates the scheduling server illustrated in FIG. 1 in more detail, including aspects of the present disclosure.

FIG. 2 is a block diagram illustrating aspects of scheduling server 40 discussed above with respect to FIG. 1. As discussed above, scheduling server 40 determines at which one of a plurality of datacenters 20 and a time at which to execute application 14 based, at least in part, on price data 55, an amount of watts per unit of time utilized by one or more server 30s in executing a requested application, and an estimated amount of processing time required to execute application 14 at one or more servers 30. Scheduling server 40 includes processor 42, memory 44, logic 46, and network interface 48.

In general, scheduling server 40 comprises any suitable combination of hardware and/or software implemented in one or more modules to provide the described functions and operations. In some embodiments, scheduling server 40 may comprise a general-purpose personal computer (PC), a Macintosh, a workstation, a Unix-based computer, a server computer, or any suitable processing device. In some embodiments, the functions and operations described above may be performed by a pool of multiple scheduling servers 40.

Memory 44 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as price data 55, information indicating the number of watts consumed per unit of processing time for each server 30, information indicating an amount of processing time required to process requested applications 14, data associated with applications 14, and/or applications 14. Although FIG. 2 illustrates memory 44 as internal to scheduling server 40, it should be understood that memory 44 may be internal or external to scheduling server 40, depending on particular implementations. Memory 44 may be separate from or integral to other memory devices to achieve any suitable arrangement of memory devices for use in system 10.

Memory 44 is further operable to store logic 46. Logic 46 generally comprises rules, algorithms, code, tables, and/or other suitable instructions for determining a least-cost datacenter 20 and a least-cost execution time in accordance with the operation discussed above. In particular embodiments, logic 46 also comprises instructions for scheduling and/or executing applications.

Memory 44 is communicatively coupled to processor 42. Processor 42 is generally operable to execute logic 46 to select a least-cost datacenter 20 and a least-cost execution time in accordance with the operation discussed above. Processor 42, in particular embodiments, may execute logic 46 to instruct client 60 to execute the requested application at the selected least-cost execution time and/or least-cost datacenter 20. In some embodiments, processor 42 may execute the requested application on server 30 and/or scheduling server 40. Processor 42 comprises any suitable combination of hardware and software implemented in one or more modules to provide the described function or operation.

Network interface 48 communicates information with network 70. For example, network interface 48 may receive request 12 from client 60 to execute application 14 through network 70. Network interface 48 communicates an instruction to client 60 to execute requested application 14 at the selected least-cost execution time and/or least-cost datacenter 20. In particular embodiments, network interface receives price data 55 from price server 50 through network 70. Network interface 48 represents any port or connection, real or virtual, including any suitable hardware and/or software that enables scheduling server 40 to exchange information with network 70, price server 50, servers 30, datacenter 20, clients 60 and/or or other components of system 10.

Figure 3:
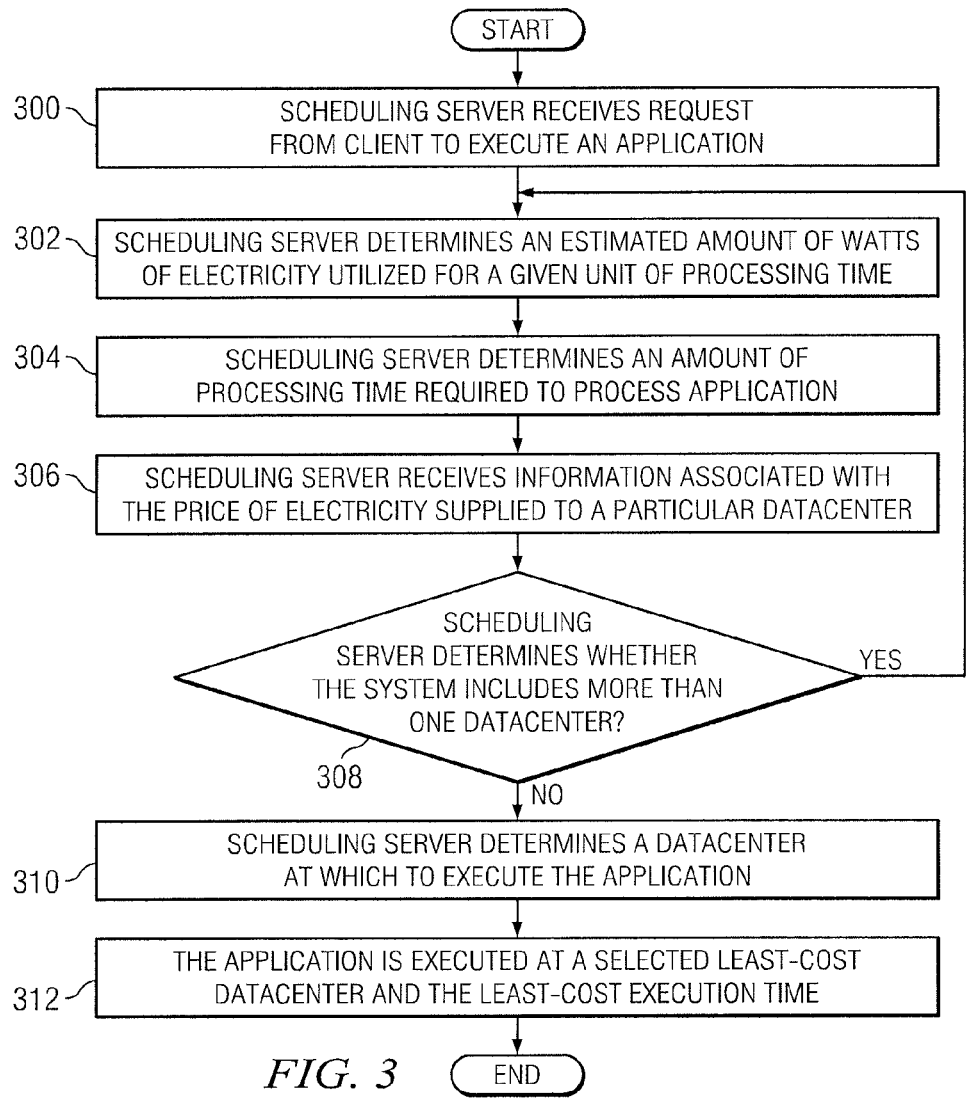
FIG. 3 is a flow chart illustrating a particular operation of the system of FIG. 1 in accordance with particular embodiments of the present disclosure.

FIG. 3 is a flow diagram illustrating an operation in accordance with a particular embodiment of system 10. In the illustrated example, operation begins at step 300, with scheduling server 40 receiving request 12 from or more client 60 to execute application 14. In some embodiments, request 12 includes information indicating the type of application 14 requested, an amount of memory and/or CPU processing power required by application 14, an amount of data that will be used during the execution application 14, a preferred and/or mandatory time at which the application 14 should be processed, and/or any other relevant considerations, factors, or variables that facilitate the determination of a least-cost execution.

At step 302, scheduling server 40 determines, for one or more servers 30 at a particular datacenter 20, an estimated amount of watts of electricity utilized for a given unit of processing time on the respective server 30. In some embodiments, scheduling server 40 may determine an amount of watts of electricity per CPU cycle a relevant server 30 consumes. An operator of system 10 determine the amount of electricity consumed during a benchmark test by the number of CPU cycles executed during the benchmark test to determine a measurement of the amount of watts of electricity per CPU cycle a particular server 30 consumes. In general, however, scheduling server 40 determines an amount of watts of electricity utilized for a given unit of processing time on servers 30 through any appropriate method. Scheduling server 40 may store a measurement of electricity consumed per CPU cycle for each server 30 in a particular datacenter 20.

At step 304, scheduling server 40 determines, for each server 30 at a particular datacenter 20, an amount of processing time required to process application 14. Scheduling server 40 may determine the amount of processing time required in any appropriate manner. In some embodiments, request 12 transmitted by client 60 may include an estimated amount of processing time required to processes application 14. In some embodiments, scheduling server 40 may receive operator input for a list of applications indicating an estimated amount of processing time required for each application 14. In some embodiments, scheduling server 40 may determine, based on the size of data requested and/or transmitted, an estimated amount of processing time required to process the data on server 30 in a particular datacenter 20. In some embodiments, scheduling server 40 may determine an estimated amount of processing time required to execute application 14 based on stored information indicating an amount of processing time utilized during one or more previous executions of application 14.

At step 306, scheduling server 40 receives information associated with the price of electricity powering a particular datacenter 20 from price server 50. In particular embodiments, price server 50 may transmit price data 55 to scheduling server 40 in response to a request for electricity pricing information from scheduling server 40, at predetermined times, and/or in response to any change in the price of electricity supplied to a particular datacenter 20. Price data 55 includes information indicating a price of electricity at one or more datacenters 20. Scheduling server 40 is thus able to receive an updated price of electricity supplied to each respective datacenter 20.

At step 308, scheduling server 40 determines whether there is more than one datacenter 20 included in system 10. If there is another datacenter 20 included in system 10 for which the operations in steps 302-306 have not yet been performed, the operation repeats, beginning at step 302. If there are no more datacenters 20 included in system 10 for which to perform the steps of 302-306, operation proceeds at step 310.

At step 310, scheduling server 40 determines, based on price data 55, an amount of watts per unit of processing time for each server 30 at each respective datacenter 20, and an amount of processing time required to process the requested application on each server 30 at each respective datacenter 20, a datacenter 20 at which to execute application 14. In particular embodiments, to select a datacenter 20 at which to execute application 14, scheduling server 40, for each server 30 at each datacenter 20, multiplies the estimated amount of watts of power utilized for a given unit of processing time by the estimated amount of processing time required to execute application 14 to determine an estimated amount of watts that will be utilized when application 14 is executed. Scheduling server 40 may then multiply an estimated amount of watts that will be utilized when application 14 is executed by the price of electricity for the respective datacenter 20 as indicated in price data 55. Thus, scheduling server 40 is able to determine a least-cost datacenter 20 and a least-cost execution time.

At step 312, application 14 is executed at the selected least-cost datacenter 20 and the least-cost execution time. Once a least-cost datacenter 20 and a least-cost execution time is selected, scheduling server may transmit an instruction to client 20 to execute application 14 at the selected least-cost datacenter 20 at the selected least-cost execution time. In particular embodiments, scheduling server 40 itself may execute application 14 at the selected least-cost datacenter 20 at the least-cost execution time, and may transmit a display, print-outs, data, information, audio, video, and/or any other suitable results of executing application 14 to client 60.

The steps illustrated in FIG. 3 may be combined, modified, or deleted where appropriate, and additional steps may also be added to those shown.

Additionally, the steps may be performed in any suitable order without departing from the scope of the present disclosure.

Although the present disclosure has been described with several embodiments, numerous changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method comprising:
   receiving, with a processor, a request for execution of an application;
   for each of a plurality of datacenters, determining an amount of electricity required to execute the application at the respective datacenter, wherein each of the plurality of datacenters comprises a plurality of processors, and wherein determining the amount of electricity comprises:
      determining an amount of electricity consumed by each of the plurality of processors for a predetermined unit of processing time; and
      for each of the plurality of processors at each respective datacenter, determining a number of predetermined units of processing time required to execute the application;
   receiving price data for each of the plurality of datacenters, the price data indicative of a price of electricity at each of a plurality of times of day;
   for each of the plurality of datacenters, determining a cost associated with executing the application at the respective datacenter for each of the plurality of times of day based, at least in part, on:
      the amount of electricity required to execute the application at the respective datacenter; and
      the price data; and
   scheduling the application for execution on one of the plurality of datacenters at one of the plurality of times of day based, at least in part, on the cost associated with executing the application at each of the respective datacenters.

2. The method of claim 1, wherein executing the application further comprises executing the application at the scheduled one of the plurality of times of day.

3. The method of claim 1, wherein the request for execution of the application further comprises data to be processed during execution of the application, and wherein the number of predetermined units of processing time required to execute the application are determined based on the data to be processed during execution of the application.

4. The method of claim 3, further comprising:
   determining a size of the data to be processed, and wherein the number of predetermined units of processing time required to execute the application are further determined based on the size of the data to be processed.

5. A system comprising:
   a scheduling server operable to:
      receive the request to execute the application;
      for each of a plurality of datacenters, determine an amount of electricity required to execute the application at the respective datacenter, wherein each of the plurality of datacenters comprises a plurality of processors, and wherein determining the amount of electricity comprises:
         determining an amount of electricity consumed by each of the plurality of processors for a predetermined unit of processing time; and
         for each of the plurality of processors at each respective datacenter, determining a number of predetermined units of processing time required to execute the application;
      receive price data for each of the plurality of datacenters, the price data indicative of a price of electricity at each of a plurality of times of day;
      for each of the plurality of datacenters, determine a cost associated with executing the application at the respective datacenter for each of the plurality of times of day based, at least in part, on:
         the amount of electricity required to execute the application at the respective datacenter; and
         the price data; and
      schedule the application for execution on one of the plurality of datacenters at one of the plurality of times of day based, at least in part, on the cost associated with executing the application at each of the respective datacenters.

6. The system of claim 5, wherein the selected one of the plurality of datacenters is further operable to execute the application at the scheduled one of the plurality of times of day.

7. The system of claim 5, wherein the request for execution of the application further comprises data to be processed during execution of the application, and wherein the number of predetermined units of processing time required to execute the application are determined based on the data to be processed during execution of the application.

8. The system of claim 7, the scheduling server further operable to:
determine a size of the data to be processed, and wherein the number of predetermined units of processing time required to execute the application are further determined based on the size of the data to be processed.

9. A tangible non-transitory computer readable storage medium comprising logic, the logic operable, when executed on a process to:
receive a request for execution of an application;
for each of a plurality of datacenters, determine an amount of electricity required to execute the application at the respective datacenter, wherein each of the plurality of datacenters comprises a plurality of processors, and wherein determining the amount of electricity comprises:
determining an amount of electricity consumed by each of the plurality of processors for a predetermined unit of processing time; and
for each of the plurality of processors at each respective datacenter, determining a number of predetermined units of processing time required to execute the application;
receive price data for each of the plurality of datacenters, the price data indivative of a price electricity at each of a plurality of times of day;
for each of the plurality of datacenters, determine a cost associated with executing the application at the respective datacenter for each of the plurality of times of day based, at least in part, on:
the amount of electricity required to execute the application at the respective datacenter; and
the price data; and
schedule the application for execution on one of the plurality of datacenters at one of the plurality of times of day based, at least in part, on the cost associated with executing the application at each of the respective datacenters.

10. The tangible computer readable storage medium of claim 9, wherein the logic is operable to execute the application by executing the application at the selected one of the plurality of times of day.

11. The tangible computer readable storage medium of claim 9, wherein the request for execution of the application further comprises data to be processed during execution of the application, and wherein the number of predetermined units of processing time required to execute the application are determined based on the data to be processed during execution of the application.

12. The tangible computer readable storage medium of claim 11, the logic further operable to:
determine a size of the data to be processed, and wherein the number of predetermined units of processing time required to execute the application are further determined based on the size of the data to be processed.

13. A system comprising:
means for receiving, with a processor, a request for execution of an application;
means for determining, for each of a plurality of datacenters, an amount of electricity required to execute the application, wherein each of the plurality of datacenters comprises a plurality of processors, and wherein determining the amount of electricity comprises:
determining an amount of electricity consumed by each of the plurality of processors for a predetermined unit of processing time; and
for each of the plurality of processors at each respective datacenter, determining a number of predetermined units of processing time required to execute the application;
means for receiving price data for each of the plurality of datacenters, the price data indicative of a price of electricity at each of a plurality of times of day;
means for determining, for each of the plurality of datacenters, a cost associated with executing the application at each respective datacenter for each of the plurality of times of day based, at least in part, on:
the amount of electricity required to execute the application at each respective datacenter; and
the price data; and
means for scheduling the application for execution on one of the plurality of datacenters at one of the plurality of times of day based, at least in part, on the cost associated with executing the application at each of the respective datacenters.

* * * * *